(12) United States Patent
Racine et al.

(10) Patent No.: US 11,506,608 B2
(45) Date of Patent: Nov. 22, 2022

(54) EXCITATION AND PHOTOLUMINESCENCE DETECTION DEVICE

(71) Applicant: Commissariat à l'Énergie Atomique et aux Énergies Alternatives, Paris (FR)

(72) Inventors: Benoit Racine, Grenoble (FR); Pierre Blandin, Grenoble (FR); Etienne Quesnel, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 17/083,620

(22) Filed: Oct. 29, 2020

(65) Prior Publication Data

US 2021/0131969 A1 May 6, 2021

(30) Foreign Application Priority Data

Oct. 30, 2019 (FR) ...................... 1912217

(51) Int. Cl.
*G01N 21/64* (2006.01)
(52) U.S. Cl.
CPC ..... *G01N 21/6489* (2013.01); *G01N 21/6454* (2013.01); *G01N 2201/0628* (2013.01)
(58) Field of Classification Search
CPC ... G01N 2201/0628; G01N 2021/6482; G01N 21/6486; G01N 21/64; G01N 21/6489; G01N 21/6454
See application file for complete search history.

(56) References Cited

U.S. PATENT DOCUMENTS

| 6,331,438 | B1 | 12/2001 | Aylott et al. | |
| 7,768,650 | B2 | 8/2010 | Bazylenko | |
| 11,175,227 | B2* | 11/2021 | Rothberg | ........... G01N 21/6408 |
| 2016/0041095 | A1* | 2/2016 | Rothberg | ............. C12Q 1/6874 506/4 |

OTHER PUBLICATIONS

Preliminary Search Report for French Application No. 1912217, dated Jul. 8, 2020.
Adams et al., Single-frame 3D fluorescence microscopy with ultra-miniature lensless FlatScope. Science Advances. Dec. 1, 2017;3(12):e1701548.

(Continued)

*Primary Examiner* — David P Porta
*Assistant Examiner* — Fani Polyzos Boosalis
(74) *Attorney, Agent, or Firm* — Wolf, Greenfield & Sacks, P.C.

(57) ABSTRACT

A device for exciting objects with an excitation radiation and for detecting a photoluminescence radiation emitted by the objects after the absorption of the excitation radiation. The device includes a wall in contact with the objects, an organic light-emitting diode for emitting the excitation radiation and transparent to the photoluminescence radiation, an optical resonator tuned to the wavelength of the photoluminescence radiation and located on the side of the organic light-emitting diode opposite to the wall, and at least one sensor of the photoluminescence radiation arranged on the side of the optical resonator opposite to the organic light-emitting diode.

10 Claims, 4 Drawing Sheets

(56) References Cited

OTHER PUBLICATIONS

Antipa et al., DiffuserCam: lensless single-exposure 3D imaging. Optica. Jan. 20, 2018;5(1):1-9.
Berg et al., Cellphone-based hand-held microplate reader for point-of-care testing of enzyme-linked immunosorbent assays. ACS Nano. Aug. 25, 2015;9(8):7857-66.
Paiè et al., Microfluidic Based Optical Microscopes on Chip. Cytometry Part A. Oct. 2018;93(10):987-96.
Wu et al., Lensless digital holographic microscopy and its applications in biomedicine and environmental monitoring. Methods. Mar. 1, 2018;136:4-16.
Zhang et al., Portable point-of-care diagnostic devices. Analytical Methods. 2016;8(44):7847-67.
FR1912217, Jul. 8, 2020, Preliminary Search Report.

* cited by examiner

EXCITATION AND PHOTOLUMINESCENCE DETECTION DEVICE

This application claims priority to French patent application number 1912217, filed on Oct. 30, 2019, the contents of which is incorporated herein by reference in its entirety.

TECHNICAL BACKGROUND

The present disclosure generally concerns excitation and photoluminescence detection, particularly fluorescence detection, devices.

PRIOR ART

The ability of an entity, called luminophore, to absorb light in a defined spectral range and to reemit light in a spectral band offset towards higher wavelengths is called photoluminescence.

For certain applications, particularly in biological imaging or for a reaction monitoring, it is desirable to have a compact device for exciting a luminophore and detecting the light reemitted by the luminophore by photoluminescence. The photoluminescent marker may be integrated in the sample to be studied and enable to specifically monitor certain entities or reactions.

Figure 1:
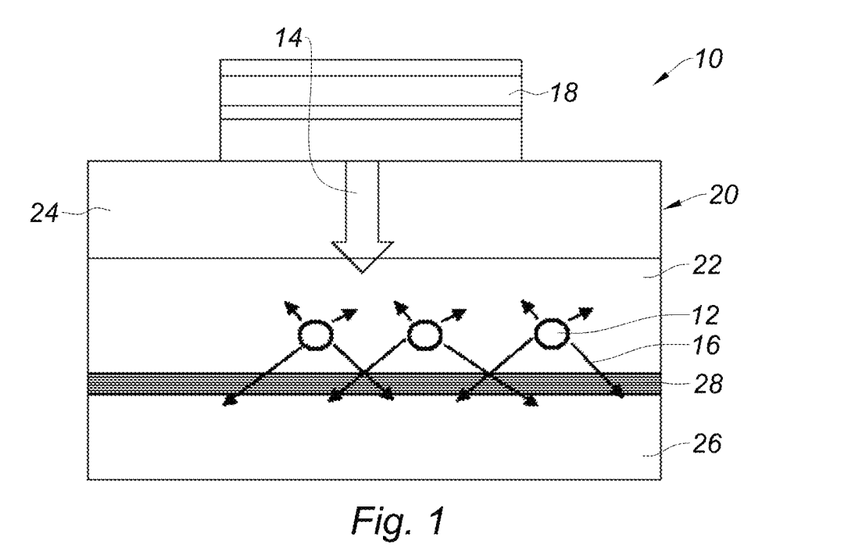
FIG. 1, previously described, shows an example of a device of luminous excitation of objects to be studied and of detection of a photoluminescence radiation emitted by the objects.

FIG. 1 is a partial simplified cross-section view of an example of a device 10 for exciting objects 12 to be studied, particularly biological objects, with an excitation radiation 14 having a wavelength $\lambda_{source}$, and of detection of a photoluminescence radiation 16 of wavelength $\lambda_{fluo}$ emitted by objects 12 after absorption of excitation radiation 14.

Excitation and detection device 10 comprises:
- a light source 18, for example, a light-emitting diode, for emitting excitation radiation 14;
- a support 20 comprising a cavity 22 containing the objects 12 to be studied, light source 18 illuminating objects 12 through a portion 14 of support 20 transparent to excitation radiation 14;
- a sensor 26 of photoluminescence radiation 16 arranged on the side of cavity 22 opposite to light source 18; and
- an optical filter 28 interposed between cavity 22 and sensor 26 and capable of only giving way to photoluminescence radiation 16.

In operation, the objects 12 to be studied are arranged in cavity 22, which may be tight, and are illuminated by excitation radiation 14. Objects 12 then emit photoluminescence radiation 16, which is detected by sensor 26. In such a configuration, only the photoluminescence radiation 16 emitted in the same direction as excitation radiation 14 can be detected by sensor 26. Sensor 26 may comprise a single photodetector. In this case, excitation and detection device 10 may be used to detect the presence or the absence of objects 12 (photoluminescence signal or not) and to measure their relative concentration by the photoluminescence signal level. Sensor 26 may comprise an array of photodetectors. In this case, excitation and detection device 10 may be used for fluorescence imaging since spatial information is also detected.

The excitation and detection device 10 illustrated in FIG. 1 has several disadvantages. A disadvantage is that optical filter 28 has to block the portion of excitation radiation 14 which has crossed medium 22, that is, which has not been absorbed by the objects 12 to be studied, and which is generally relatively intense, and to give way to photoluminescence radiation 16, which generally has a much lower intensity. Optical filter 28 must thus have a high rejection rate, the rejection rate corresponding to the ratio of the transmittance of the filter at wavelength $\lambda_{fluo}$ to the transmittance of the filter at wavelength $\lambda_{source}$. This generally imposes, to form optical filter 28, using a complex multilayer structure interference filter, which may be expensive to form. Another disadvantage is that source 18 and sensor 26 are arranged on either side of the objects 12 to be studied, which imposes constraints on excitation and detection device 10. Indeed, all the portions of device 10 on the path of radiation 14 between source 18 and objects 12 should be transparent to radiation 14 and all the portions of the device 10 on the path of radiation 16 between objects 12 and sensor 26 should be transparent to radiation 16. Further, to maximize the detected signal, source 18 and sensor 26 should both be close to objects 12, which imposes mechanical constraints on the thickness on the walls of cavity 22 both on the side of source 18 and on the side of sensor 26.

SUMMARY

An embodiment overcomes all or part of the disadvantages of known excitation and photoluminescence detection devices.

An object of an embodiment is for the excitation and photoluminescence detection device to be compact.

Another object of an embodiment is for the excitation and photoluminescence detection device to comprise no optical filter of complex structure and high manufacturing cost, particularly a multilayer structure interference filter of complex structure and high manufacturing cost.

Another object of an embodiment is, when the excitation and photoluminescence detection device comprises an optical filter, for the latter to correspond to an optical filter having a low manufacturing cost.

Another object of an embodiment is for the light source of the excitation and photoluminescence detection device to be close to the objects to the studied.

An embodiment provides a device for exciting objects with an excitation radiation and for detecting a photoluminescence radiation emitted by the objects after the absorption of the excitation radiation, comprising:
- a wall intended to come into contact with the objects;
- a first organic light-emitting diode for emitting the excitation radiation and transparent to the photoluminescence radiation;
- an optical resonator tuned to the wavelength of the photoluminescence radiation and located on the side of the first organic light-emitting diode opposite to the wall; and
- at least one first sensor of the photoluminescence radiation arranged on the side of the optical resonator opposite to the first organic light-emitting diode.

According to an embodiment, the device further comprises an optical filter between the optical resonator and the first sensor.

According to an embodiment, the device further comprises a diffusing element between the optical resonator and the first sensor.

According to an embodiment, the device comprises a second sensor of the photoluminescence radiation or of an additional photoluminescence radiation at a wavelength different from the wavelength of the photoluminescence radiation, the second sensor being arranged on the side of the wall opposite to the first organic light-emitting diode.

According to an embodiment, the optical resonator comprises an organic or inorganic layer between two two-way mirrors.

According to an embodiment, the first organic light-emitting diode comprises an electrode corresponding to one of the two-way mirrors.

According to an embodiment, the first organic light-emitting diode is capable of emitting the excitation radiation comprising a first power peak at a first wavelength and a second power peak at a second wavelength different from the first wavelength.

According to an embodiment, the device comprises a second organic light-emitting diode and an opaque shield interposed between the second organic light-emitting diode and the first sensor.

An embodiment also provides a system comprising a plurality of devices such as previously-defined.

An embodiment also provides a method for exciting objects with an excitation radiation and for detecting a photoluminescence radiation emitted by the objects after the absorption of the excitation radiation, implementing the device such as previously defined, comprising placing into contact the wall with the objects.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail. In particular, the light source control method and system and the method and the system for processing the signals delivered by the sensor of the excitation and photoluminescence device are well known by those skilled in the art and are not described hereafter.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., unless specified otherwise, it is referred to the orientation of the drawings or to an excitation and detection device in a normal position of use. Unless specified otherwise, the expressions "around", "approximately", "substantially" and "in the order of" signify within 10%, and preferably within 5%.

The transmittance of a layer corresponds to the ratio of the intensity of the radiation coming out of the layer to the intensity of the radiation entering in the layer. In the following description, a layer or a film is said to be opaque to a radiation when the transmittance of the radiation through the layer of the film is smaller than 10%, preferably smaller than 5%. In the rest of the disclosure, a layer or a film is called transparent or semi-transparent to a radiation when the transmittance of the radiation through the layer or the film is greater than 10%, preferably greater than 20%, more preferably greater than 50%. Further, in the following description, a layer or a film is called semi-reflective when the ratio of the intensity of the radiation reflecting on the layer or the film to the intensity of the radiation reaching the layer or the film is greater than 10%, preferably greater than 20%, and the ratio of the intensity of the radiation entering the layer or the film to the intensity of the radiation reaching the layer or the film is greater than 10%. Further, it is here considered that the terms "insulating" and "conductive" respectively signify "electrically insulating" and "electrically conductive".

In the following description, the refraction index of a material corresponds to the refraction index of the material for a useful wavelength range. Unless specified otherwise, the refraction index is considered as substantially constant over the useful wavelength range, for example, equal to the average of the refraction index over the useful wavelength range.

In the following description, a film or a layer is said to be oxygen-tight when the permeability of the film or of the layer to oxygen at 40° C. is smaller than $1.10^{-1}$ cm$^3$/(m$^2$·day), preferably smaller than $1.10^{-2}$ cm$^3$/(m$^2$·day), more preferably smaller than $1.10^{-1}$ cm$^3$/(m$^2$·day). The permeability to oxygen may be measured according to the ASTM D3985 method entitled "Standard Test Method for Oxygen Gas Transmission Rate Through Plastic Film and Sheeting Using a Coulometric Sensor". In the following description, a film or a layer is said to be water-tight when the permeability of the film or of the layer to water at 40° C. is smaller than $1.10^{-1}$ g/(m$^4$ day), preferably smaller than $1.10^{-3}$ g/(m$^2$*day), more preferably smaller than $1.10^{-5}$ g/(m$^2$*day). The permeability to water may be measured according to the ASTM F1249 method entitled "Standard Test Method for Water Vapor Transmission Rate Through Plastic Film and Sheeting Using a Modulated Infrared Sensor".

Figure 2:
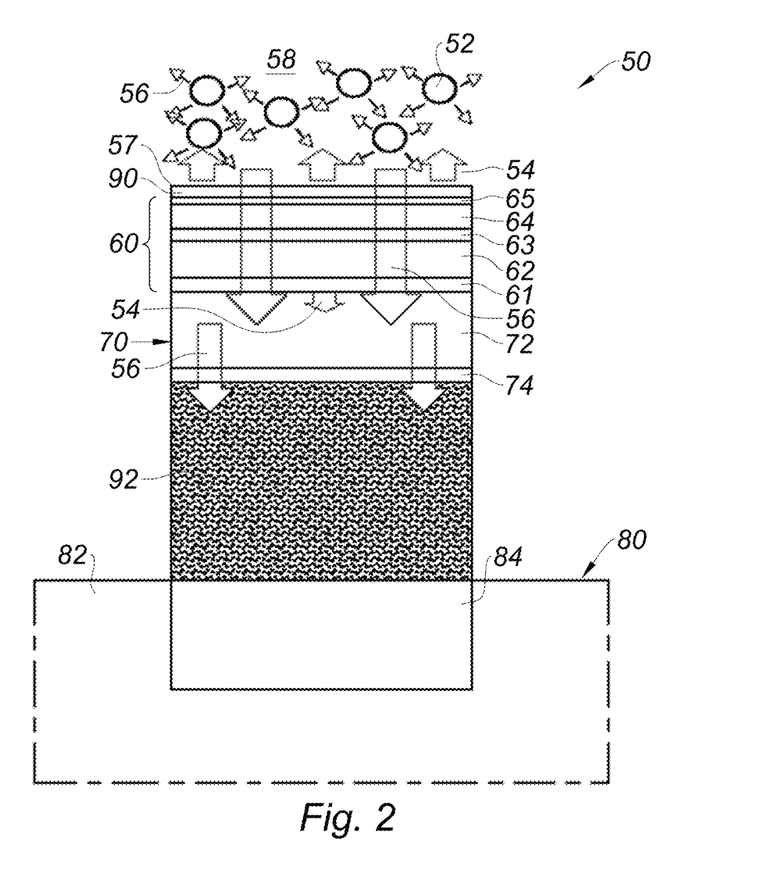
FIG. 2 shows an embodiment of a higher-performance device of luminous excitation of objects to be studied and of detection of a photoluminescence radiation emitted by the objects.

FIG. 2 is a partial simplified cross-section view of an embodiment of a device 50 for exciting objects 52 to be studied, particularly biological objects 52, by an excitation radiation 54 having a wavelength $\lambda_{source}$, and for detecting a photoluminescence radiation 56 having a wavelength $\lambda_{fluo}$ emitted by objects 52 after the absorption of excitation radiation 54. As an example, the objects 52 to be studied may correspond to proteins, to DNA of cells marked by means of a luminophore, to cells genetically modified to be fluorescent, to fluorescent beads, or to quantum dots linked to antibodies, etc. Excitation radiation 54 is preferably substantially monochromatic at wavelength $\lambda_{source}$, the latter being within the spectral absorption band of the observed luminophore. An example of application concerns fluorescence microscopy, particularly epifluorescence microscopy.

Excitation and detection device 50 comprises:
- a wall 57 in contact with the medium containing the objects 52 to be studied, wall 57 being capable of delimiting, at least partly, a cavity 58, partially shown in FIG. 2, containing the objects 52 to be studied;
- an organic light-emitting diode 60 (OLED) for emitting excitation radiation 54, light-emitting diode 60 being transparent to photoluminescence radiation 56;
- an optical cavity 70, also called optical resonator, tuned to wavelength $\lambda_{fluo}$, located on the side of light-emitting diode 60 opposite to wall 57; and
- at least one sensor 80 of photoluminescence radiation 56 arranged on the side of optical cavity 70 opposite to light-emitting diode 60, sensor 80 comprising a support 82 and at least one photodetector 84, for example, a photodiode, capable of detecting photoluminescence radiation 56.

Light-emitting diode 60 may be separated from cavity 58 by a protective coating 90, which then delimits wall 57, and which may be a glass cover or a monolayer or multilayer structure.

In the embodiment shown in FIG. 2, excitation and detection device 50 comprises an optical element 92 interposed between optical cavity 70 and photodetector 80. According to an embodiment, optical element 92 corresponds to a diffusing element. According to another embodiment, optical element 92 corresponds to a coding mask, also called amplitude mask or phase mask. According to another embodiment, optical element 92 corresponds to an optical filter. Element 92 may be omitted, optical cavity 70 then being in contact with photodetector 84. When optical element 92 corresponds to an optical filter, it may be a color filter.

According to an embodiment, excitation and detection device 50 is placed in contact with the medium containing the objects 52 to be studied via wall 57, which is for example applied against the medium containing objects 52. Excitation and detection device 50 may then contain no cavity 58. An example of application corresponds to endoscopy or to surface inspection. When excitation and detection device 50 comprises cavity 58 at least partly delimited by wall 57, a sample containing the objects 52 to be studied may be introduced into cavity 58.

Excitation and detection device 50 operates as follows: light-emitting diode 60 emits excitation radiation 54 in all directions and particularly, preferably, towards the objects 52 to be studied. Objects 52 at least partly absorb excitation radiation 54 and reemit photoluminescence radiation 56 in all directions, and particularly through light-emitting diode 60, towards optical cavity 70. Optical cavity 70 is a device where certain light rays are capable of remaining confined due to two-way mirrors on which they reflect. The light reflected a plurality of times by the mirrors may interfere with itself. As a result, only a few wavelengths and their associated waves may be present in optical cavity 70. In the present embodiment, optical cavity 70 only gives way to photoluminescence radiation 56, which is detected by photodetector 84.

According to an embodiment, for example using the green fluorescent protein (GFP), wavelength $\lambda_{source}$ is in the range from 450 nm to 480 nm and wavelength $\lambda_{fluo}$ is in the range from 505 nm to 550 nm. The wavelengths are adjustable according to the selected luminophore.

Excitation and detection device 50 may be used alone or associated with other excitation and detection devices 50.

According to an embodiment, support 82 may correspond to a semiconductor substrate, for example, made of silicon, and photodetector 84 may correspond to an inorganic photodiode formed in support 82. In particular, support 82 and photodetector 84 may correspond to a CMOS (complementary metal-oxide-semiconductor) sensor. According to another embodiment, support 82 may be made of a dielectric material. Support 82 is for example a rigid support, particularly made of glass, or a flexible support, for example, made of polymer or of a metallic material. Examples of polymers are polyethylene naphthalene (PEN), polyethylene terephthalate (PET), polyimide (PI), and polyetheretherketone (PEEK). The thickness of support 82 then is, for example, in the range from 20 µm to 1 cm, for example, approximately 125 µm. Photodetector 84 may then correspond to an organic photodiode.

According to an embodiment, organic light-emitting diode 60 comprises a stack of layers comprising:
- a first metal electrode 61;
- a first interface layer 62;
- an active layer 63;
- a second interface layer 64; and
- a second non-metal electrode 65.

Active layer 63 is interposed between the first and second interface layers 62, 64. First interface layer 62 is interposed between first electrode 61 and active layer 63. Second interface layer 64 is interposed between active layer 63 and second electrode 65. First interface layer 62 and/or second interface layer 64 may be omitted.

According to an embodiment, the material forming first electrode 61 is selected from the group comprising:
- a metal or a metal alloy, for example, silver (Ag), gold (Au), lead (Pb), palladium (Pd), copper (Cu), nickel (Ni), tungsten (W), molybdenum (Mo), aluminum (Al), chromium (Cr), or an alloy of magnesium and silver (MgAg);
- silver, and/or copper nanowires; and
- a mixture of at least two of these materials.

Second electrode 65 is advantageously non-metallic to prevent the forming of an optical cavity in the stack of layers 61, 62, 63, and 64, which would give way to radiation 54 at wavelength $\lambda_{source}$ and would block the radiation at wavelength $\lambda_{fluo}$. According to an embodiment, the material forming second electrode 65 is selected from the group comprising:
- a conductive oxide such as tungsten oxide ($WO_3$), nickel oxide (NiO), vanadium oxide ($V_2O_5$), tin oxide ($SnO_2$), or molybdenum oxide ($MoO_3$), particularly a transparent conductive oxide (TCO), particularly indium tin oxide (ITO), an aluminum zinc oxide (AZO), a gallium zinc oxide (GZO), a multilayer ITO/Ag/ITO structure, a multilayer ITO/Mo/ITO structure, a multilayer AZO/Ag/AZO structure, or a multilayer ZnO/Ag/ZnO structure;
- a conductive polymer, particularly a polyaniline or the PEDOT:PSS polymer, which is a mixture of poly(3,4)-ethylenedioxythiophene and of sodium polystyrene sulfonate;
- carbon nanowires;
- graphene; and a mixture of at least two of these materials.

The thickness of first electrode 61 may be in the range from 10 nm to 30 nm. The thickness of second electrode 65 may be in the range from 10 nm to 200 nm. The different nature of the first and second electrodes 61, 65 results in that the radiation 54 emitted by light-emitting diode 60 may preferably propagate to objects 52.

Interface layer 62 or 64 may correspond to an electron injection layer or to a hole injection layer. The work function of interface layer 62 or 64 is adapted to blocking, collecting, or injecting holes and/or electrons according to whether the interface layer plays the role of a cathode or of an anode. More particularly, when interface layer 62 or 64 plays the role of an anode, it corresponds to a hole injection and electron blocking layer. The work function of interface layer 62 or 64 is then greater than or equal to 4.5 eV, preferably greater than or equal to 5 eV. When interface layer 62 or 64 plays the role of a cathode, it corresponds to an electron injection and hole blocking layer. The work function of interface layer 62 or 64 is then smaller than or equal to 4.5 eV, preferably smaller than or equal to 4.2 eV.

In the case where interface layer 62 or 64 plays the role of an electron injection layer, the material forming interface layer 62 or 64 is selected from the group comprising:
- a metal oxide, particularly a titanium oxide or a zinc oxide;
- a host/molecular dopant system, particularly the products commercialized by Novaled under trade names NET-5/NDN-1 or NET-8/MDN-26;
- a conductive or doped semiconductor polymer, for example, the PEDOT:Tosylate polymer, which is a mixture of poly(3,4)-ethylenedioxythiophene and of tosylate;
- a carbonate, for example $CsCO_3$;
- a polyelectrolyte, for example, poly[9,9-bis(3'-(N,N-dimethylamino)propyl)-2,7-fluorene-alt-2,7-(9,9-dioctyfluorene)] (PFN), poly[3-(6-trimethylammoniumhexyl] thiophene (P3TMAHT), or poly[9,9-bis(2-ethylhexyl)fluorene]-b-poly[3-(6-trimethylammoniumhexyl] thiophene (PF2/6-b-P3TMAHT);
- a polyethyleneimine (PEI) polymer or a polyethyleneimine ethoxylated (PEIE), propoxylated, and/or butoxylated polymer; and
- a mixture of two or more of these materials.

In the case where interface layer 62 or 64 plays the role of a hole injection layer, the material forming interface layer 62 or 64 may be selected from the group comprising:
- a conductive or doped semiconductor polymer, particularly the materials commercialized under trade names Plexcore OC RG-1100, Plexcore OC RG-1200 by Sigma-Aldrich, the PEDOT:PSS polymer, which is a mixture of poly(3,4)-ethylenedioxythiophene and of sodium polystyrene sulfonate, or a polyaniline;
- a molecular host/dopant system, particularly the products commercialized by Novaled under trade names NHT-5/NDP-2 or NHT-18/NDP-9;
- a polyelectrolyte, for example, Nafion;
- a metal oxide, for example, a molybdenum oxide, a vanadium oxide, ITO, or a nickel oxide; and
- a mixture of two or more of these materials.

The thickness of each interface layer 62, 64 is in the range from 5 nm to 10 μm, preferably from 10 nm to 1 μm, particularly in the order of 30 nm.

Active layer 63 is the layer from which most of the electromagnetic radiation supplied by light-emitting diode 60 is emitted. Light-emitting diode 60 is called organic since active layer 63 is mostly, preferably totally, made of at least one organic material or of a mixture of organic or metal-organic materials.

Active layer 63 comprises at least one organic material and may comprise a stack or a mixture of a plurality of organic materials. Active layer 63 may comprise a mixture of an electron donor polymer and of an electron acceptor molecule. The functional area of active layer 63 is delimited by the overlapping of first interface layer 62 and of second interface layer 64. The currents crossing the functional area of active layer 63 may vary from a few picoamperes to a few tens of milliamperes. The thickness of active layer 63 may be in the range from 10 nm to 1 μm, for example, in the order of 30 nm.

Active layer 63 may comprise small molecules, oligomers, or polymers. These may be organic or inorganic materials. Active layer 63 may comprise an ambipolar semiconductor material, or a mixture of an N-type semiconductor material and of a P-type semiconductor material, for example in the form of stacked layers or of an intimate mixture at a nanometer scale to form a bulk heterojunction.

Example of P-type semiconductor polymers capable of forming active layer 63 are poly(3-hexylthiophene) (P3HT), poly[N-9'-heptadecanyl-2,7-carbazole-alt-5,5-(4,7-di-2-thienyl-2',1',3'-benzothiadiazole] (PCDTBT), poly[(4,8-bis-(2-ethylhexyloxy)-benzo[1,2-b;4,5-b']dithiophene)-2,6-diyl-alt-(4-(2-ethylhexanoyl)-thie-no[3,4-b] thiophene))-2,6-diyl];4,5-b]dithi-ophene)-2,6-diyl-alt-(5,5'-bis(2-thienyl)-4,4,-dinonyl-2,2'-bithiazole)-5',5"-diyl] (PBDTTT-C), poly [2-methoxy-5-(2-ethyl-hexyloxy)-1,4-phenylene-vinylene] (MEH-PPV) or Poly[2,6-(4,4-bis-(2-ethylhexyl)-4H-cyclopenta[2,1-b;3,4-b]dithiophene)-alt-4,7(2,1,3-benzothiadiazole)] (PCPHOTODETECTORBT).

Examples of N-type semiconductor materials capable of forming active layer 63 are fullerenes, particularly C60, [6,6]-phenyl-$C_{61}$-butyric acid methyl ester ([60]PCBM), [6,6]-phenyl-$C_{71}$-butyric acid methyl ester ([70]PCBM), perylene diimide, zinc oxide (ZnO), or nanocrystals enabling to form quantum dots.

The thickness of the stack comprising first interface layer 62, active layer 63, and second interface layer 64 is in the range from 100 nm to 4 μm, preferably from 120 nm to 2 μm.

Optical cavity 70 comprises a stack of layers comprising:
- a first semi-reflective layer which, in the present embodiment, corresponds to electrode 61 of light-emitting diode 60;
- an intermediate layer 72 having a thickness L and a refraction index n; and
- a second semi-reflective layer 74, intermediate layer 72 being interposed between the first and second semi-reflective layers 61 and 74.

Second semi-reflective layer 74 may be made of one of the materials previously described for first electrode 61 and second electrode 65. The thickness of second semi-reflective layer 74 is in the range from 10 nm to 50 nm.

Intermediate layer 72 may be made of an organic or inorganic material. When intermediate layer 72 is made of an organic material, it may correspond to all the previously-described organic hole and electron injection materials, to tris(8-hydroxy-quinolato)aluminum ($Alq_3$), to 2,2',7,7'-tetra (N,N-di-p-tolyl)amino-9,9-spirobifluorene (STTB), to low-temperature crosslinkable resins, or to resists. When intermediate layer 72 is made of an inorganic material, it may correspond to dielectric of SiO, $SiO_2$, $SnO_2$, $WO_3$ type or to all dielectrics capable of being deposited in a thin film at low temperature (smaller than 100° C.).

Thickness L is given by the following relation [Math. 1]:

$$L = \frac{m\lambda}{4n} \quad \text{[Math. 1]}$$

where λ is the wavelength capable of coming out of optical cavity 70, that is, the wavelength $\lambda_{fluo}$ of photoluminescence radiation 56, where m is an integer generally equal to 1, and where n is, as previously indicated, the refraction index of the material of layer 72.

As an example, in the case where wavelength $\lambda_{fluo}$ is equal to approximately 520 nm, which corresponds to the green color, where the refraction index of intermediate layer 72 is equal to 1.8, where coefficient m is equal to 1, thickness L of intermediate layer 72 is equal to approximately 72 nm. Generally, the thickness of intermediate layer 72 is in the range from 50 nm to 300 nm.

According to an embodiment, protective coating 90 comprises at least one oxygen- and water-tight layer. This layer may be made of inorganic materials such as $TiO_2$, $Al_2O_3$, SiO, or $SiO_2$, or of organic materials of polymer or resin type. The protection layer may also be formed of multilayers alternating organic materials and inorganic materials. The thickness of protective coating 90 may be in the range from 25 nm to 100 μm. The protective coating may also be a glass cover having a thickness capable of being in the range from 50 μm to 700 μm.

Optical element 92 may correspond to an absorbing filter for which the light is blocked based on the absorption properties of the material used to form optical element 92. When optical element 92 corresponds to a color filter, it may correspond to a colored resin layer, a colored glass, for example, the glass sold under trade named HOYA G545, a gelatin layer, or a polymer layer having organic dyes dissolved therein so that the selected organic dye determines the spectral properties of the filter. The polymer may be cellulose acetate or another plastic material. The thickness of optical element 92 may then be in the range from 50 μm to 5 mm.

Optical element 92 may correspond to a dichroic filter, comprising an alternation of thin layers having selected refraction indices and thicknesses enabling to reflect a portion of the incident light and to transmit the useful portion. When optical element 92 corresponds to a dichroic filter, the thickness of the stack of layers forming optical element 92 may then be in the range from 2 μm to 5 μm.

When optical element 92 corresponds to a diffusing element, it may correspond to a frosted glass layer. The thickness of optical element 92 may then be in the range from 50 μm to 1 mm. The diffusing element provides a lens effect by increasing the numerical light collection aperture (recovery of the light emitted at greater angles, and thus of higher spatial frequencies corresponding to smaller objects), but deteriorates the recorded images (need for a numerical reconstruction) and decreases the quantity of collected signal. The diffuser typically has a scattering angle in the range from 0.5° to 5°. Optical element 92 may correspond to both a diffusing element and an optical filter.

When optical element 92 corresponds to a coding mask, it may correspond to a chromium layer deposited on a glass plate and locally etched by photolithography and etch steps. The thickness of optical element 92 may then be in the range from 50 μm to 1 mm.

The dimensions of cavity 58, when present, depend on the envisaged applications. According to an embodiment, cavity 58 has a volume in the range from 5 μL to 1 mL.

According to an embodiment, extraction and detection device 50 comprises a reflective layer, not shown, which delimits cavity 58 on the side opposite to wall 57. The reflective wall reflects both the portion of excitation radiation 54 which has not been absorbed at the first passage through the sample to be studied and that may be absorbed after the back reflection by objects 52, and the portion of photoluminescence radiation 56 which is emitted by objects 52 in the direction opposite to organic light-emitting diode 60 and to sensor 80 to send it back to sensor 80.

Figure 3:
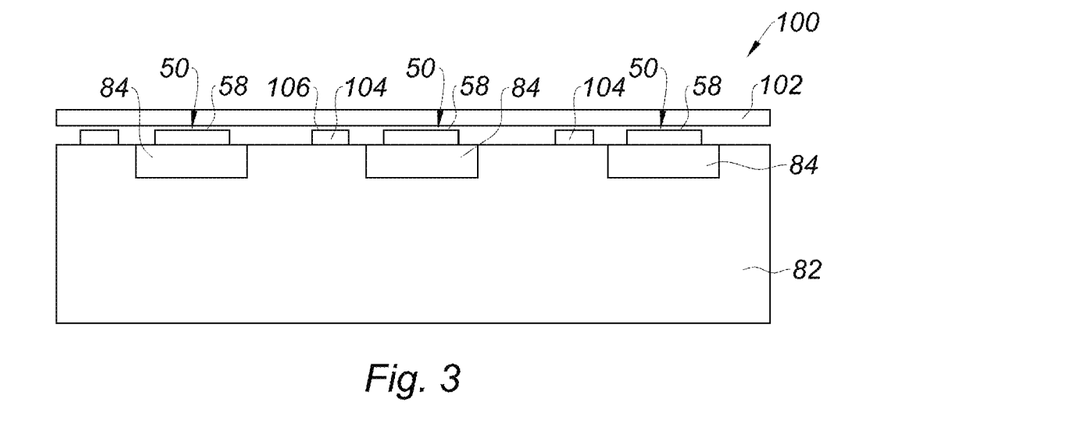
FIG. 3 shows an embodiment of a detector comprising a plurality of excitation and detection devices such as that shown in FIG. 2.

FIG. 3 is a partial simplified cross-section view of an embodiment of an excitation and detection system 100 comprising an array of excitation and detection devices 50 such as shown in FIG. 2. Excitation and detection system 100 may comprise from 1 to 100 excitation and detection devices 50. According to an embodiment, the support 82 of the sensors 84 of excitation and detection devices 50 is common to all excitation and detection devices 50. According to an embodiment, support 82 may correspond to a semiconductor substrate, for example, made of silicon, and each photodetector 84 may correspond to a photodiode formed in support 82.

According to an embodiment, system 100 may comprise a cover 102 which covers excitation and detection devices 50 and which delimits the corresponding cavity 58 with each excitation and detection device 50. FIG. 3 further shows protrusions 104 at the surface of support 82 which take part in delimiting with cover 102 circulation paths 106 towards cavities 58 and from cavities 58. According to another embodiment, detector 100 is attached to a microfluidic card which comprises systems for transporting objects 52 to cavities 58.

System 100, or excitation and detection device 50 used alone, may be used for the photoluminescence detection and quantization. In this case, element 92 may be omitted or may correspond to an optical filter capable of giving way to photoluminescence radiation 56 and of blocking excitation radiation 54, as a complement to optical cavity 70. System 100 may be used to form a spatially resolved photoluminescence image. In this case, element 92 may correspond to a diffusing element or to a coding mask and the system for processing the signals delivered by photodetectors 84 is capable of reconstructing an image based on the captured signals.

An advantage of excitation and detection device 50 is that it can be formed in compact and robust fashion. Indeed, the layers forming optical cavity 70 and organic light-emitting diode 60 may be directly deposited on sensor 80 or on the microfluidic card.

Another advantage of excitation and detection device 50 is that organic light-emitting diode 60 may be close to the objects 52 to be studied. Indeed, in the present embodiment, organic light-emitting diode 60 is only separated from objects 52 by protective coating 90.

Another advantage of excitation and detection device 50 is that sensor 80 can be close to the objects 52 to be studied given the small thickness of organic light-emitting diode 60 and of optical cavity 70. This improves the intensity of the photoluminescence radiation 56 captured by sensor 80. Such a proximity may also enable to recover spatial information which, due to the incoherence of the photoluminescence emission, rapidly disappears as the signal propagates.

Figure 4:
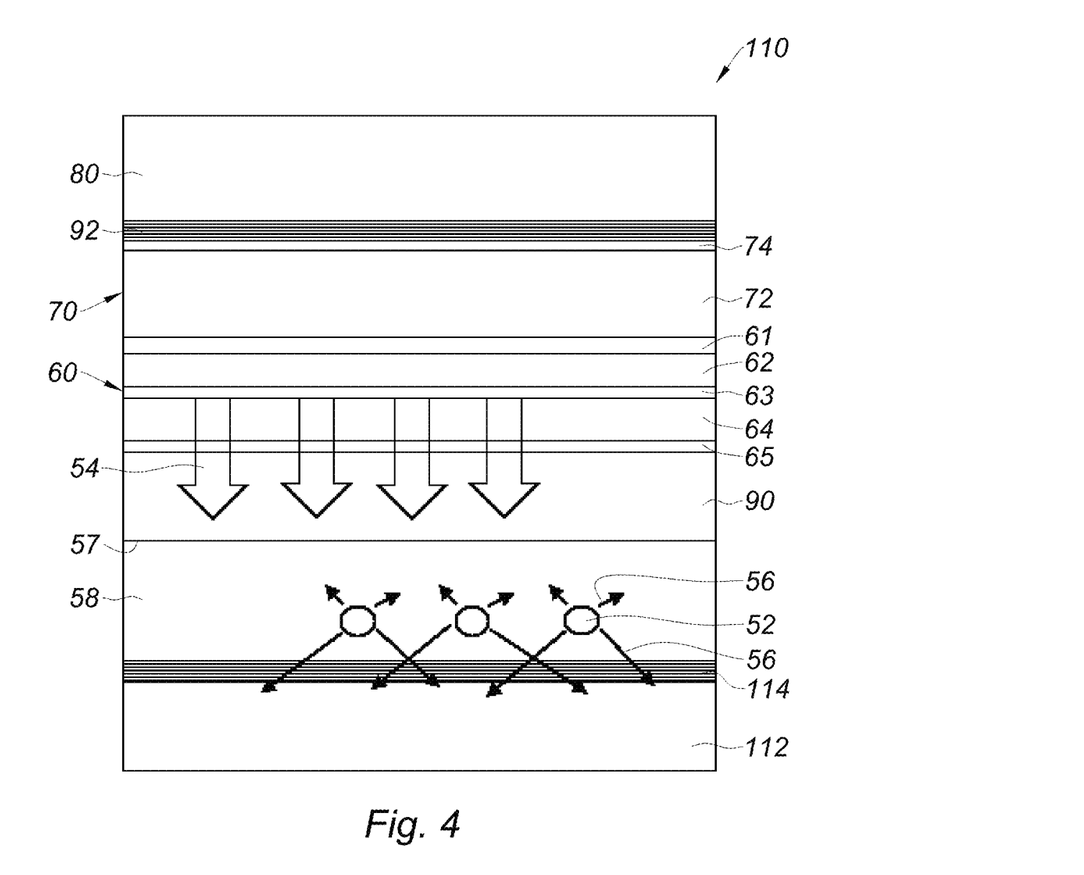
FIG. 4 shows another embodiment of an excitation and photoluminescence detection device.

FIG. 4 is a partial simplified cross-section view of another embodiment of a device 110 for exciting objects 52 to be studied with excitation radiation 54 and for detecting the photoluminescence radiation 56 emitted by objects 52 after the absorption of excitation radiation 54.

Device 110 comprises all the elements of device 50 shown in FIG. 2 and further comprises, on the side of cavity 58 opposite to organic light-emitting diode 60, a sensor 112 of photoluminescence radiation 56 and an optical filter 114, for example, an interference filter, interposed between cavity 58 and sensor 112, and only capable of giving way to photoluminescence radiation 56.

According to an embodiment, the use of two sensors 80 and 112 enables to capture a greater quantity of photoluminescence radiation 56 as compared with an excitation and detection device 50 only comprising sensor 80. The sensitivity of excitation and detection device 110 may thus be higher than the sensitivity of excitation and detection device 50.

Sensors 80 and 112 of photoluminescence radiation 56 may have different properties. According to an embodiment, sensor 112 may be a sensor with a sensitivity greater than the sensitivity of sensor 80 but with a spatial resolution smaller than the spatial resolution of sensor 80. In this case, sensor 80 may be used for photoluminescence imaging and sensor 112 may be used for photoluminescence detection.

According to another embodiment, sensor 112 is capable of detecting a photoluminescence radiation at a wavelength $\lambda_{fluo2}$ different from wavelength $\lambda_{fluo}$. Device 110 can then be used with objects 52 capable of emitting one or the other to two photoluminescence radiations when they are excited by excitation radiation 54, according to the configuration of objects 52. Device 110 may further be used simultaneously with first and second objects 52, the first objects being capable of emitting a photoluminescence radiation 56 at wavelength $\lambda_{fluo}$ when they absorb excitation radiation 54 at wavelength $\lambda_{source}$ and the second objects being capable of emitting a photoluminescence radiation 56 at wavelength $\lambda_{fluo2}$ when they absorb excitation radiation 54 at wavelength $\lambda_{source}$. Device 110 may further be used simultaneously with first and second objects 52, the first objects being capable of emitting a photoluminescence radiation at wavelength $\lambda_{fluo}$ when they absorb excitation radiation 54 at wavelength source and the second objects being capable of emitting a photoluminescence radiation at wavelength $\lambda_{fluo2}$ when they absorb another excitation radiation 54 at a wavelength $\lambda_{source2}$. Organic light-emitting diode 60 then has an emission spectrum with two emission peaks at wavelengths $\lambda_{source}$ and $\lambda_{source2}$.

Figure 5:
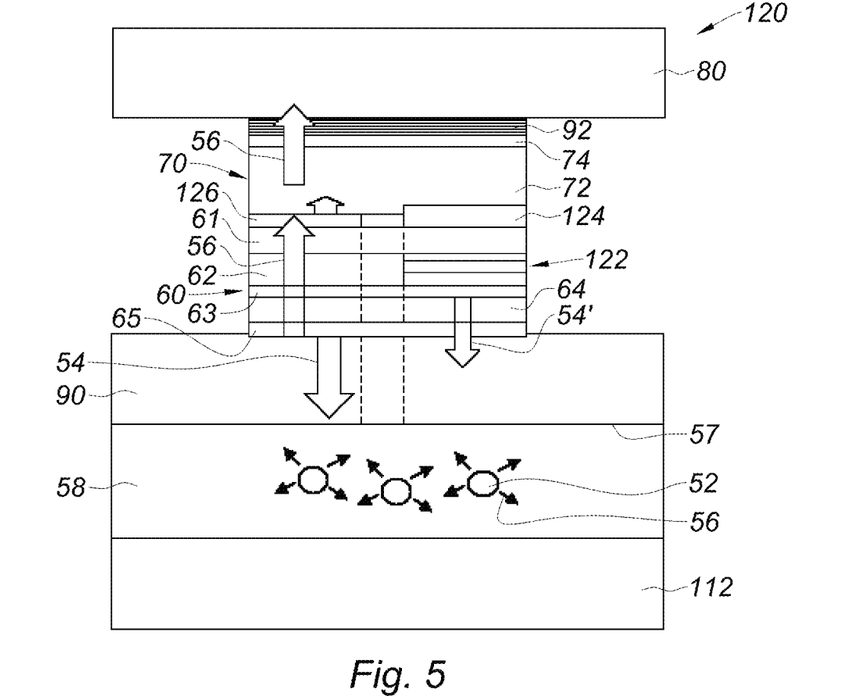
FIG. 5 shows another embodiment of an excitation and photoluminescence detection device.

FIG. 5 is a partial simplified cross-section view of another embodiment of a device 120 for exciting objects 52 to be studied with excitation radiation 54 and for detecting the photoluminescence radiation 56 emitted by objects 52 after the absorption of excitation radiation 54.

Device 120 comprises all the elements of the device 110 shown in FIG. 4 and further comprises an additional organic light-emitting diode 122. According to an embodiment, additional organic light-emitting diode 122 is formed adjacent to organic light-emitting diode 60, that is, interposed between cavity 58 and optical cavity 70. According to an embodiment, at least some of the layers of organic light-emitting diode 122 and of organic light-emitting diode 60 are common. In the embodiment illustrated in FIG. 5, electrodes 61 and 65, active layer 63, and interface layer 64 are common to the two light-emitting diodes 60 and 122.

According to an embodiment, device 120 further comprises a layer 124, interposed between organic light-emitting diode 122 and sensor 80, which is opaque to the radiation emitted by organic light-emitting diode 122. Opaque layer 124 prevents the excitation radiation 54' emitted by organic light-emitting diode 122 from reaching sensor 80. As an example, opaque layer 124 is located between organic light-emitting diode 122 and the organic layer 72 of optical cavity 70. According to an embodiment, optical cavity 70 comprises, on the side of cavity 58, a two-way mirror 126, different from electrode 61, only opposite light-emitting diode 60. According to an embodiment, additional light-emitting diode 122 is capable of emitting a substantially monochromatic radiation 54' at a wavelength $\lambda_{source2}$ different from wavelength $\lambda_{ksource}$. In this case, sensor 112 may then be adapted to fluorescent imaging.

According to an embodiment, light-emitting diode 122 is capable of emitting a narrow spectrum radiation centered on a wavelength $\lambda_{source2}$ different from wavelength $\lambda_{source}$. In this case, sensor 112 may then be adapted to holographic imaging. According to an embodiment, organic light-emitting diode 122 is capable of emitting a wide spectrum radiation, for example, white light. Sensor 112 may then be adapted to absorption imaging.

FIGS. 6 to 9 are partial simplified cross-section views of structures obtained at successive steps of a method of manufacturing the excitation and detection device 100 previously described in relation with FIG. 3.

Figure 6:
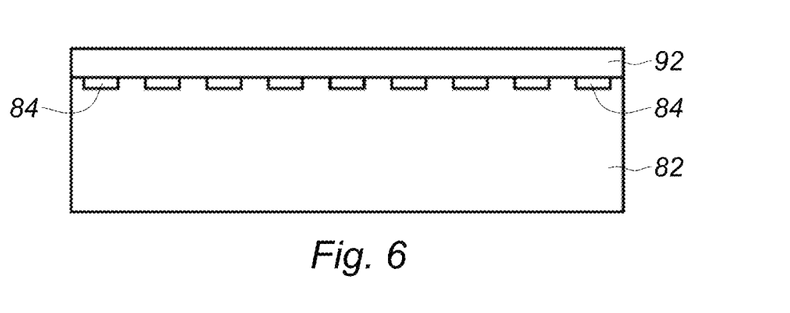
FIG. 6 illustrates a step of a method of manufacturing the excitation and photoluminescence detection device shown in FIG. 2.

FIG. 6 shows the structure obtained after the forming in support 82 of an array of photodetectors 84 and the manufacturing of optical element 92, for example, an optical filter, a diffusing element, or a coding mask.

Figure 7:
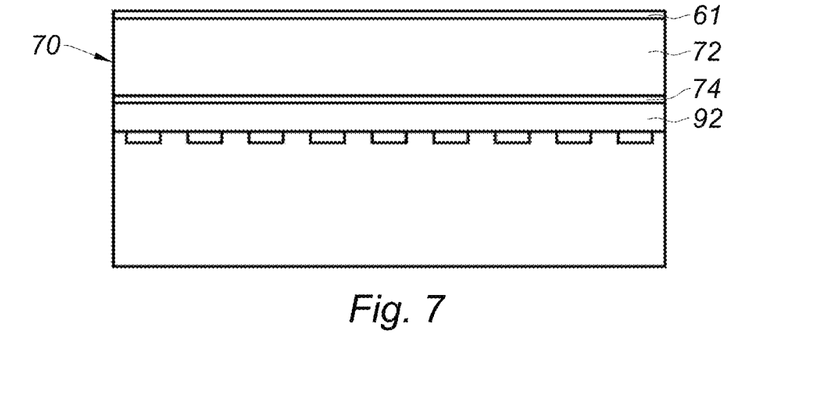
FIG. 7 illustrates another step of the manufacturing method.

FIG. 7 shows the structure obtained after the forming of optical cavity 70 on optical element 92, comprising the successive deposition of semi-reflective layer 74, of intermediate layer 72, and of semi-reflective layer 61.

Figure 8:
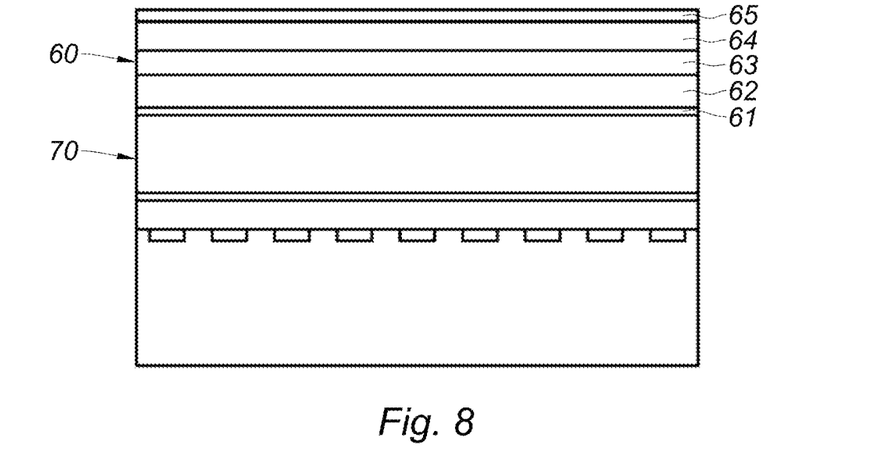
FIG. 8 illustrates another step of the manufacturing method.

FIG. 8 shows the structure obtained after the forming of organic light-emitting diode 60 on optical cavity 70, successively comprising the deposition of first interface layer 62, of active layer 63, of second interface layer 64, and of second electrode 65.

Figure 9:
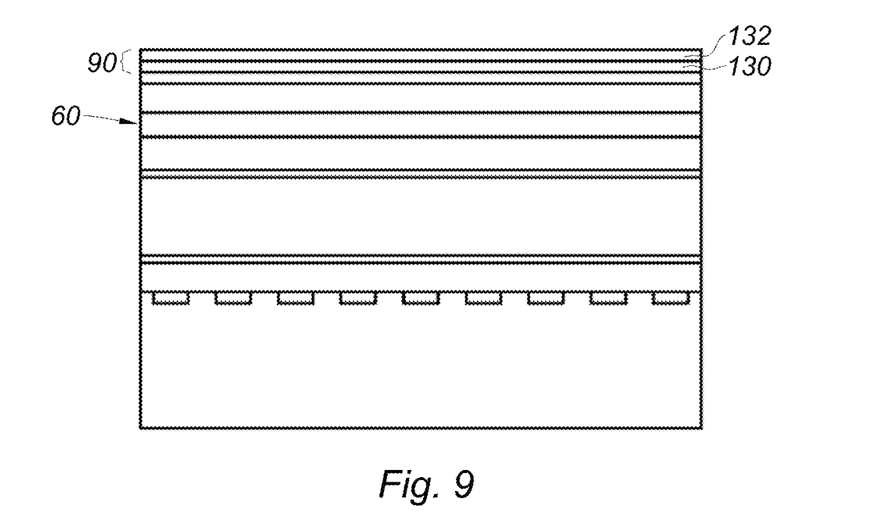
FIG. 9 illustrates another step of the manufacturing method.

FIG. 9 shows the structure obtained after the forming of protective coating 90 on light-emitting diode 60 which, as an example, comprises a stack of two layers 130 and 132.

According to the material forming each layer of optical element 92, of optical cavity 70, of organic light-emitting diode 60, and of protective coating 90, the layer forming method may correspond to a method such as spin coating, spray coating, heliography, slot-die coating, blade coating, flexography, or silk screening. According to the implemented deposition method, a step of drying the deposited materials may be provided.

Various embodiments and variants have been described. Those skilled in the art will understand that certain features of these various embodiments and variants may be combined, and other variants will occur to those skilled in the art. In particular, although, in the previously-described embodiments, the device of luminous excitation of objects to be studied and of detection of a photoluminescence radiation emitted by the objects only comprises a single optical cavity 70, it should be clear that the excitation and detection device may comprise at least two optical resonators in cascade to increase the efficiency of the blocking of the radiation at wavelength $\lambda_{source}$. Finally, the practical implementation of the embodiments and variants described herein is within the capabilities of those skilled in the art based on the functional indications provided hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for exciting objects with an excitation radiation and for detecting a photoluminescence radiation emitted by the objects after the absorption of the excitation radiation, comprising:
- a wall intended to come into contact with the objects;
- a first organic light-emitting diode for emitting the excitation radiation and transparent to the photoluminescence radiation;
- an optical resonator tuned to the wavelength of the photoluminescence radiation and located on the side of the first organic light-emitting diode opposite to the wall; and
- at least one first sensor of the photoluminescence radiation arranged on the side of the optical resonator opposite to the first organic light-emitting diode.

2. The device according to claim 1, further comprising an optical filter between the optical resonator and the first sensor.

3. The device according to claim 1, further comprising a diffusing element between the optical resonator and the first sensor.

4. The device according to claim 1, comprising a second sensor of the photoluminescence radiation or of an additional photoluminescence radiation at a wavelength different from the wavelength of the photoluminescence radiation, the second sensor being arranged on the side of the wall opposite to the first organic light-emitting diode.

5. The device according to claim 1, wherein the optical resonator comprises an organic or inorganic layer between two two-way mirrors.

6. The device according to claim 5, wherein the first organic light-emitting diode comprises an electrode corresponding to one of the two-way mirrors.

7. The device according to claim 1, wherein the first organic light-emitting diode is capable of emitting the excitation radiation comprising a first power peak at a first wavelength and a second power peak at a second wavelength different from the first wavelength.

8. The device according to claim 1, comprising a second organic light-emitting diode and an opaque shield interposed between the second organic light-emitting diode and the first sensor.

9. A system comprising a plurality of devices according to claim 1.

10. A method of exciting objects with an excitation radiation and of detecting a photoluminescence radiation emitted by the objects after the absorption of the excitation radiation, implementing the device according to claim 1, comprising placing the wall into contact with the objects.

* * * * *